United States Patent [19]

Aronson et al.

[11] Patent Number: 4,863,632

[45] Date of Patent: Sep. 5, 1989

[54] ENCAPSULATED BLEACH PARTICLES FOR MACHINE DISHWASHING COMPOSITIONS

[75] Inventors: Michael Aronson, West Nyack, N.Y.; Michele R. Lock, Bethlehem, Pa.; Edward Santos, Guttenberg, N.J.

[73] Assignee: Lever Brothers Company, New York, N.Y.

[21] Appl. No.: 192,429

[22] Filed: May 10, 1988

Related U.S. Application Data

[62] Division of Ser. No. 931,361, Nov. 14, 1986, Pat. No. 4,762,637.

[51] Int. Cl.[4] ........................ C11D 3/395; C11D 7/54; D06L 3/06; C01B 7/00

[52] U.S. Cl. ........................ 252/186.35; 252/186.34; 252/186.36

[58] Field of Search ........................ 252/186.34, 186.35, 252/186.36

[56] References Cited

U.S. PATENT DOCUMENTS

| | | | |
|---|---|---|---|
| 3,112,274 | 11/1963 | Morgenthaler et al. | 252/99 |
| 3,380,922 | 4/1968 | Shields et al. | 252/99 |
| 3,576,760 | 4/1971 | Gould | 252/403 |
| 3,579,455 | 5/1971 | Sabatelli et al. | 252/135 |
| 3,634,260 | 1/1972 | Pickin | 252/95 |
| 3,666,680 | 5/1972 | Briggs | 252/316 |
| 3,691,090 | 9/1972 | Kitajima et al. | 252/316 |
| 3,825,498 | 7/1974 | Altenschopfer et al. | 252/99 |
| 3,887,480 | 6/1975 | Rue et al. | 252/135 |
| 3,908,045 | 9/1975 | Alterman et al. | 427/213 |
| 3,975,280 | 8/1976 | Hachmann et al. | 252/102 |
| 3,992,317 | 11/1976 | Brichard et al. | 252/186 |
| 4,136,052 | 1/1979 | Mazzola | 252/94 |
| 4,409,117 | 10/1983 | Holmberg et al. | 252/99 |
| 4,421,664 | 12/1983 | Anderson et al. | 252/94 |
| 4,486,327 | 12/1984 | Murphy et al. | 252/94 |
| 4,536,314 | 8/1985 | Hardy et al. | 252/102 |
| 4,713,079 | 12/1987 | Chun et al. | 252/186.34 X |
| 4,725,378 | 2/1988 | Krawczak | 252/186.35 |
| 4,731,195 | 3/1988 | Olson | 252/186.25 X |
| 4,759,956 | 7/1988 | Amer | 427/213 |

FOREIGN PATENT DOCUMENTS

| | | |
|---|---|---|
| 0038985 | 4/1981 | European Pat. Off. . |
| 0145438 | 6/1985 | European Pat. Off. . |
| 3337750 | 4/1984 | Fed. Rep. of Germany . |
| 61-028441 | 2/1986 | Japan . |
| 61-028597 | 2/1986 | Japan . |
| 1294557 | 11/1972 | United Kingdom . |
| 1423536 | 2/1976 | United Kingdom . |

*Primary Examiner*—Brooks H. Hunt
*Assistant Examiner*—Virginia B. Caress
*Attorney, Agent, or Firm*—Milton L. Honig

[57] ABSTRACT

A particle for releasing bleach is provided combining from 50 to 99.5% of a core consisting essentially of an oxidizing material and from 0.5 to 20% of a polycarboxylate coating surrounding the core. These particles are particularly useful in automatic dishwasher powder detergent compositions.

17 Claims, No Drawings

ENCAPSULATED BLEACH PARTICLES FOR MACHINE DISHWASHING COMPOSITIONS

This is a divisional application of Ser. No. 931,361 filed November 14, 1986, now U.S. Pat. No. 4,762,637.

BACKGROUND OF THE INVENTION

1. Field of the Invention

The invention relates to bleach releasing particles and their use in mechanical dishwashing compositions.

2. The Prior Art

An important component of most commercial granular machine dishwashing detergents is bleach. Normally, the bleach component is a material having at least one reactive chlorine which will generate hypochlorite in solution. Chlorine bleach performs several functions including removing stains, sanitizing surfaces and degrading protein soils. Particularly critical is the protein soil degradation function because proteins are known to deposit on glassware leading to unsightly spots which consumers find objectionable.

Many types of chlorine bleaches are known to the art. They all, however, serve as a source of hypochlorite (more precisely hypochlorous acid) which is the active species. Hypochlorite, being a strong oxidizing agent, can interact with various sensitive ingredients of commercial machine dishwashing formulations. These ingredients include perfumes, dyes, surfactants and bases. Free water present in the formulation contributes further to the bleach reactivity with the aforesaid ingredients. These interactions lead to a gradual loss of chlorine available for chemical cleaning and a deterioration of the dishwashing performance. Instability is accelerated by storage at high temperature and/or humidity. Under such conditions, there may occur fading of product dye, fragrance deterioration and solubility decrease.

Although some hypochlorite sources are more stable than others, they all suffer at least some loss in available chlorine on storage. To minimize the drop in cleaning performance, it is common practice to overdose the bleach. Overdosing is not only costly but does not completely solve the stabilization problem. For instance, as much as 80% of the original chlorine content can be lost yet the bleach may still be potent enough to interact with other parts of the composition. Stabilization of chlorine bleach thus remains an important problem in machine dishwashing compositions. Furthermore, it must be noted that the chlorine bleach overdose approach still does not solve the problem of dye and perfume deterioration.

U.S. Pat. No. 3,112,274 (Morgenthaler et al.) discloses the use of inorganic salts such as sodium tripolyphosphate, applied in a fluidized bed, to coat polychloroisocyanurate bleach releasing salts. The resultant encapsulated salts are said to be protected from decomposition by the attack of moisture, and insulated from reacting with sensitive organic materials.

Organic coating materials have also been reported as encapsulates for chlorine bleaches formulated for laundry detergents. For instance, U.S. Pat. No. 4,136,052 (Mazzola) surrounds an active chlorinating agent with a first non-reactive coating combination of fatty acid and wax. A second coating is applied thereonto containing fatty acid with a material exhibiting inverse aqueous solubility with respect to temperature. The outer, second coating is more resistent to dissolution in hot than in cold water. Similarly, U.S. Pat. No. 3,908,045 (Alterman et al.) discloses dichloroisocyanurate salts encapsulated with a first coating of a saturated fatty acid surrounded by a second coating of soap.

From the foregoing, it can be seen that many coating agents have been disclosed in the literature to stabilize chlorine bleach for detergent compositions. The reported organic coatings have included fatty acids, soaps, waxes (e.g. paraffin wax and low molecular weight polyethylenes), and oily substances (e.g. dialkylphthalates). Unfortunately, these and other similar materials are unsuitable for machine dishwashing applications for several reasons.

Materials such as common fatty acids, which are soluble in an alkaline media, can produce excessive foam under the high agitation characteristic of the mechanical dishwasher. Fatty acids, waxes and oily substances that are insoluble in water can indeed stabilize chlorine bleach as is well known in the art. However, these coating materials release the bleaching agent through melting or cracking during the course of the wash cycle. Their release can therefore be erratic especially considering the short wash times and lower wash temperatures found with present day equipment. Furthermore, oily or waxy materials can act as a sink for oleophilic components in the formulation, e.g., nonionic surfactants and perfume components. Finally, water insoluble oils or waxes by their very nature are prone to deposit on dishes, glassware, or the dishwasher. Deposits are particularly objectionable to consumers.

Consequently, it is an object of the present invention to provide bleach particles which are sufficiently aggressive to clean dishes and glassware but are storage stable to high temperature, moisture and reactive detergent components.

A further object of this invention is to provide bleach particles that are sufficiently cleaning aggressive but nevertheless do not significantly interact with detergent co-components such as perfumes, dyes and surfactants.

A further object of this invention is to provide bleach particles which will generate little or no foam in detergent compositions subjected to conditions of mechanical dishwashing.

Another object of this invention is to provide bleach particles that substantially retain their available chlorine upon storage but upon dissolution in an aqueous alkaline solution quickly release active bleaching agent yet do not have the potential for detracting from glass appearance.

SUMMARY OF THE INVENTION

A particle for releasing bleach is provided comprising:

(i) from 50 to 99.5% by weight of said particle of a core consisting essentially of an oxidizing material having at least one reactive chlorine or bromine in its molecular structure; and (ii) from 0.5 to 20% by weight of said particle of a polycarboxylate coating selected from homo- and co-polymers of carboxylic acids, carboxylic anhydrides, alkyl partial esters thereof and their salt derivatives, said coating being free of soap and fatty acids.

An automatic dishwasher detergent composition is also provided by the present invention which comprises:

(i) from 0.5 to 15% by weight of the aforesaid bleach particles;

(ii) from 5 to 70% of a detergency builder; and (iii) from 1 to 20% of a silicate salt.

DETAILED DESCRIPTION OF THE INVENTION

According to the present invention, the storage stability of oxidizing materials such as chlorine bleach used in machine dishwashing compositions can be dramatically improved. Deleterious interactions of the bleach with various formulation components may be prevented by coating the bleach with an appropriate alkali soluble polymer. Both performance and aesthetic appeal is significantly improved by the encapsulation.

Most important to the invention is the choice of coating material. The invention has identified homopolymer and copolymer carboxylic acids, alkyl partial esters thereof and their salt derivatives as being effective encapsulation materials. These polymers advantageously produce little or no foam when subject to machine dishwashing conditions. Furthermore, these coatings are non-reactive toward the oxidizing material when not containing amine, hydroxyl, ether, alkene or alkyne functionality.

Illustrative of suitable homopolymers of this invention are those of polyacrylic acid and polymethacrylic acid. Molecular weights of these materials may range from about 1,000 to over 200,000. Polyacrylic homopolymers are commercially available from Rohm & Haas and the B. F. Goodrich Company.

A further property required of the coating material is that it act as a barrier for both moisture and organic ingredients that can react with the bleach. It has been found that with regard to this criteria, the most effective coating materials are not homopolymers but rather copolymers. These copolymers must exhibit a balance between their hydrophilic and hydrophobic components. The term "copolymer" is also intended to include ter- and higher mixed unit polymers Copolymers that are especially preferred have at least two types of monomeric units, one that is hydrophilic and the other that is hydrophobic. Relative proportions of these groups in the polymer can then be adjusted to yield the balance between adequate alkali solubility and effective barrier properties. These proportions generally range from about 100:1 to 1:100, preferably 50:1 to 1:50, more preferably 10:1 to 1:10 and optimally 2:1 to 1:2. Particularly effective polymers are those that in addition to the above balance require alkali to dissolve. The alkali dissolution characteristic provides an alkali scavenging buffer zone between the bleach and detergent components to further protect the acidic bleach agent. Thus, the best performing polycarboxylate polymers are those water insoluble at pH 7 but which are solubilized in alkaline media at pH 10 or higher.

There are a number of polymers which meet the foregoing pH requirements. Copolymers of styrene and maleic anhydride and their various derivatives are especially effective. Particularly useful are the $C_1$–$C_{20}$ alkyl half esters of styrene/maleic anhydride copolymers. Commercially, there is available from Arco Chemical Company under the mark SMA 1440 a series of 1:1 molar ratio styrene/maleic anhydride copolymers and their partial esters formed by the reaction of styrene/-maleic anhydride with an alcohol such as butanol, heptanol or other higher alcohols. The degree of esterification and molecular weight are chosen so as to provide adequate stability during storage yet allow the bleach particles to dissolve quickly during the wash cycle. Particularly preferred polymers in this class are the butyl half esters having a molecular weight between 1,000 and 10,000, and optimally 1,500 to 5,000.

Partially esterified polymers of maleic anhydride, acrylic acid, or methacrylic acid and their salt derivatives have also proven to be suitable encapsulating materials. The effective partial esters are those water insoluble at pH 7 but water solubilized by aqueous alkaline media at pH 10 or higher. Illustrative of these are poly(-maleic anhydride/$C_1$–$C_{20}$ alkyl maleic acid half ester), poly(acrylic acid/$C_1$–$C_{20}$ alkyl methacrylate), poly(methacrylic acid/$C_1$–$C_{20}$ alkylacrylate), poly(acrylic acid/$C_1$–$C_{20}$ alkyl acrylate) and poly(methacrylic acid/$C_1$–$C_{20}$ alkyl methacrylate). These copolymers may be prepared by polymerization of the respective monomer pair or by esterification of pre-formed polymer with $C_1$–$C_{20}$ alkanol.

Copolymers of ethylene/maleic anhydride and acid or salt derivatives thereof have also been shown to be suitable encapsulating materials. Partially esterified polymers of ethylene/maleic anhydride and their acid or salt derivatives can also form effective coatings within the purview of this invention. It must, however, be noted that these materials are not optimal; they do not exhibit water insolubility at neutral pH in distinction to copolymers such as styrene/maleic anhydride copolymers.

Polycarboxylate copolymers containing vinyl acetate and/or styrene monomer units may also be suitable within the context of this invention. Copolymers, which term may also include terpolymer and higher combinations, can be formed between vinyl acetate, styrene, acrylic acid, and/or methacrylic acid. Illustrative of these materials are poly(acrylic acid/vinyl acetate), poly(methacrylic acid/vinyl acetate), poly(acrylic acid/$C_1$–$C_{20}$ alkyl acrylate/vinyl acetate), poly(methacrylic acid/$C_1$–$C_{20}$ alkyl methacrylate/vinyl acetate), poly(styrene/methacrylic acid), and the like. Polyvinyl acetate homopolymer, being insoluble in water, is however not suitable for purposes of this invention.

Preparation of Capsules

Many processes are known in the art for applying uniform coatings on powders. Preparation of the particles of this invention utilized a fluid bed coating process in which a solution of the polymer in a convenient solvent such as acetone or water was sprayed directly on the bleach particles agitated in the fluidized bed. The process is described in more detail in the Examples below.

It should be emphasized that many techniques are available to apply such coatings and many convenient and safe methods may be used. For example, U.S. Pat. Nos. 4,136,052; 3,908,045 and 4,126,717 all describe processes which may be suitable for the present invention; these patents are herein incorporated by reference.

Oxidizing Material

A wide variety of commonly used bleaching agents can be employed in the current invention, many of which are disclosed in various patents such as U.S. at. Nos. 4,464,281 and 3,817,869 and references such as in the ACS monograph entitled "Chlorine—Its Manufacture, Properties and Uses" by Sconce (Rheinhold 1962) and by B. Baum et al., in the "Encyclopedia of Chemical Technology", Vol. 3 (1983); all of which literature is herein incorporated by reference.

Among suitable reactive chlorine or bromine oxidizing materials are heterocyclic N-bromo and N-chloro imides such as trichlorocyanuric, tribromocyanuric, dibromocyanuric and dichlorocyanuric acids, and salts thereof with water-solubilizing cations such as potassium and sodium.

Other N-bromo and N-chloro imides may also be used such as N-brominated and N-chlorinated succinimide, malonimide, phthalimide and naphthalimide. Other compounds include the hydantoins, such as 1,3-dibromo and 1,3-dichloro-5,5-dimethylhydantoin; N-monochloro-C,C-dimethylhydantoin; methylene-bis(N-bromo-C,C-dimethylhydantoin); 1,3-dibromo and 1,3-dichloro 5-isobutylhydantoin; 1,3-bromo and 1,3-dichloro 5-methyl-5-ethylhydantoin; 1,3-dibromo and 1,3-dichloro 5,5-isobutylhydantoin; 1,3-dibromo and 1,3-dichloro 5-methyl-5-n-amylhydantoin; and the like. Further useful hypohalite liberating agents comprise tribromomelamine and trichloromelamine.

Dry, particulate, water-soluble anhydrous inorganic salts are likewise suitable for use herein such as lithium, sodium or calcium hypochlorite and hypobromite.

The hypohalite liberating agent, may, if desired, be provided in the form of a stable solid complex or hydrate. Examples include sodium p-toluene-sulfobromoamine trihydrate, sodium benzene-sulfo-chloramine dihydrate, calcium hypobromite tetrahydrate, calcium hypochlorite tetrahydrate, and the like. Brominated and chlorinated trisodium phosphate formed by the reaction of the corresponding sodium hypohalite solution with trisodium phosphate (and water if necessary) likewise comprise efficacious materials.

Sodium dichloroisocyanurate is, however, the preferred bleaching source because of its great water solubility, high chlorine content and dry storage stability. Although it could be used, calcium hypochlorite is more reactive and tends to lose chlorine activity during storage. Coarse grade sodium dichloroisocyanurate is used so that there is a high recovery of proper mesh size particles. This material is commercially available under the trademark Clearon CDB, a product of the FMC Corporation.

Bleaching agents may be employed in admixtures comprising two or more distinct chlorine donors. An example of a commercial mixed system is one available from the Monsanto Chemical Company under the trademark designation "ACL-66"(ACL signifying "available chlorine" and the numerical designation "66", indicating the parts per pound of available chlorine). The material comprises a mixture of potassium dichloroisocyanurate (4 parts) and trichloroisocyanurate acid (1 part).

Anywhere from about 50 to about 99.5% by weight of the total particle may be active halogen releasing oxidizing material. Preferably oxidizing material is present from about 80 to about 95%, more preferably from about 85 to about 95%. With regard to these overall concentrations, when releasing chlorine the oxidizing material should optimally be present in amounts to provide about 0.2 to about 2.0% available chlorine.

When utilizing the particles of this invention in a detergent formulation, the desired chlorine or bromine level in a wash solution is about 10 to about 200 parts per million available chlorine. Preferably, the range is about 15 to 50 ppm for the most efficient utilization of chlorine containing material. These levels determine the amount of bleach particles which must be incorporated into a detergent formulation.

By the term reactive chlorine or bromine is meant any oxidant capable of releasing halogen in the form of free elemental chlorine or bromine under conditions normally used for detergent bleaching purposes. It must also be understood that the hard spherical bleaching particles of this invention are not limited to their utility for mechanical dishwashing purposes. They may also be used on dentures, floors and a variety of other hard or soft surfaces requiring cleaning with a storage degradation protected oxidant.

Nonionic Surfactants

Nonionic synthetic detergents can be broadly defined as compounds produced by the condensation of alkylene oxide groups with an organic hydrophobic compound which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. Illustrative but not limiting examples of the various chemical types as suitable nonionic surfactants include:

(a) polyoxyethylene or polyoxypropylene condensates of aliphatic carboxylic acids, whether linear- or branched-chain and unsaturated or saturated, containing from 8 to about 18 carbon atoms in the aliphatic chain and incorporating from 5 to about 50 ethylene oxide or propylene oxide units. Suitable carboxylic acids include "coconut" fatty acids (derived from coconut oil) which contain an average of about 12 carbon atoms, "tallow" fatty acids (derived from tallow-class fats) which contain an average of about 18 carbon atoms, palmitic acid, myristic acid, stearic acid and lauric acid.

(b) polyoxyethylene or polyoxypropylene condensates of aliphatic alcohols, whether linear- or branched-chain and unsaturated or saturated, containing from about 6 to about 24 carbon atoms and incorporating from about 5 to about 50 ethylene oxide or propylene oxide units. Suitable alcohols include "coconut" fatty, "tallow" fatty, lauryl, myristyl and oleyl alcohols Particularly preferred nonionic surfactant compounds in this category are the "Neodol" type products, a registered trademark of the Shell Chemical Company.

Included within this category are nonionic surfactants having the formula:

$$RO-(CH_2\underset{R'}{\underset{|}{C}}HO)_x(CH_2CH_2O)_y(CH_2\underset{R''}{\underset{|}{C}}HO)_z-H$$

wherein R is a linear, alkyl hydrocarbon having an average of 6 to 10 carbon atoms, R' and R41 are each linear alkyl hydrocarbons of about 1 to 4 carbon atoms, x is an integer from 1 to 6,y is an integer from 4 to 15 and z is an integer from 4 to 25. A particularly preferred example of this category is Poly-Tergent SLF-18, a registered trademark of the Olin Corporation, New Haven, Conn. Poly-Tergent SLF-18 has a composition of the above formula where R is a $C_6$–$C_{10}$ linear alkyl mixture, R' and R" are methyl, x averages 3, y averages 12 and z averages 16.

(c) polyoxyethylene or polyoxypropylene condensates of alkyl phenols, whether linear- or branched-chain and unsaturated or saturated, containing from 6 to about 12 carbon atoms and incorporating from about 5 to about 25 moles of ethylene oxide or propylene oxide.

(d) polyoxyethylene derivatives of sorbitan mono-, di-, and tri-fatty acid esters wherein the fatty acid component has between 12 and 24 carbon atoms. The preferred polyoxyethylene derivatives are of sorbitan monolaurate, sorbitan trilaurate, sorbitan monopalmitate, sorbitan tripalmitate, sorbitan monostearate, sorbitan monoisostearate, sorbitan tristearate, sorbitan monooleate, and sorbitan trioleate. The polyoxyethylene chains may contain between about 4 and 30 ethylene oxide units, preferably about 20. The sorbitan ester derivatives contain 1, 2 or 3 polyoxyethylene chains dependent upon whether they are mono-, di-, or tri-acid esters.

(e) polyoxyethylene-polyoxypropylene block polymers having the formula:

$$HO(CH_2CH_2O)a(CH(CH_3)CH_2O)b(CH_2CH_2O)_cH$$

wherein a, b and c are integers reflecting the respective polyethylene oxide and polypropylene oxide blocks of said polymer. The polyoxyethylene component constitutes at least about 40% of the block polymer. The material preferably has a molecular weight of between about 2,000 and 10,000, more preferably from about 3,000 to about 6,000. These materials are well known in the art. They are available under the trademark "Pluronics", a product of BASF-Wyandotte Corporation.

Detergent Builder Materials

The dishwashing detergents of this invention can contain all manner of detergent builders commonly taught for use in automatic dishwashing compositions. The builders can include any of the conventional inorganic and organic water-soluble builder salts.

Typical of the well known inorganic builders are the sodium and potassium salts of the following: pyrophosphate, tripolyphosphate, orthophosphate, carbonate, bicarbonate, sesquicarbonate and borate.

Particularly preferred builders can be selected from the group consisting of sodium tripolyphosphate, sodium carbonate, sodium bicarbonate and mixtures thereof When present in these compositions, sodium tripolyphosphate concentrations will range from about 10% to about 40%; preferably from about 25% to about 40%. Sodium carbonate and bicarbonate when present can range from about 10% to about 50%; preferably from about 20% to about 40%.

Organic detergent builders can also be used in the present invention. They are generally sodium and potassium salts of the following: citrate, nitrilotriacetates, phytates, polyphosphonates, oxydisuccinates, oxydiacetates, carboxymethyloxy succinates, tetracarboxylates, starch and oxidized heteropolymeric polysaccharides. Sodium citrate is an especially preferred builder. When present it is preferably available from about 1% to about 35% of the total weight of the detergent composition.

The foregoing detergent builders are meant to illustrate but not limit the types of builder that can be employed in the present invention.

Silicate

The compositions of this invention contain sodium or potassium silicate. This material is employed as a cleaning ingredient, source of alkalinity, metal corrosion inhibitor and protector of glaze on china tableware. Especially effective is sodium silicate having a ratio of $SiO_2:Na_2O$ of from about 1.0 to about 3.3, preferably from about 2 to about 3.2. Some of the silicate may be in solid form.

Filler and Minor Components

An inert particulate filler material which is water-soluble may also be present. This material should not precipitate calcium or magnesium ions at the filler use level. Suitable for this purpose are organic or inorganic compounds. Organic fillers include sucrose, sucrose esters and urea. Representative inorganic fillers include sodium sulfate, sodium chloride and potassium chloride. A preferred filler is sodium sulfate. Its concentration may range from 0% to 60%, preferably 10% to 20%.

Minor amounts of various other adjuvants may be present in the detergent powder. These include perfumes, flow control agents, foam depressants, soil suspending agents, antiredeposition agents, anti-tarnish agents, enzymes and other functional additives.

The following examples will more fully illustrate the embodiments of the invention. All parts, percentages and proportions referred to herein and in the appended claims are by weight unless otherwise indicated.

EXAMPLE 1

Foaming Performance of Polymers vs. Soaps and Fatty Acids

Low foaming potential is a key requirement for a machine dishwashing composition. Excessive foam reduces the pump pressure in the machine that is essential for good agitation and also leads to deposition of soil on the wash load. Thus, the encapsulating material should not contribute to foaming. To evaluate the foaming potential of coating materials a series of tests were carried out as follows. A given weight of the candidate coating agent (as a solid powder) was mixed by hand with 35 gm of a commercial dishwashing powder ("Dishwasher all", ex Lever Brothers Company) and added to the wash cycle dispenser cup of a Kenmore mechanical dishwasher. Foam at the middle and end of the wash cycle was assessed visually. The test conditions were: 45° C., 120 ppm Ca/Ma 2:1, 10 minute wash cycle. The washing machine contained a wash load comprised of 14 dinner plates and 10 glass tumblers (8 oz.). Tests were done both in the presence and absence of an egg yolk soil that is known to contribute to a proteinaceous foam.

Results of the foam evaluation are shown in Table I. Fatty acids having low enough melting point to dissolve during the wash cycle produced excessive foam at concentrations greater than about 0.001% in solution. These materials are therefore unacceptable for mechanical dishwasher compositions. By contrast, the polymers listed in Table I did not contribute significantly to foaming.

TABLE I

Foam Evaluation of Potential Coating Agents

| Coating Material* | Wt.% in Solution | Foam Score No Soil | Foam Score Egg Yolk |
|---|---|---|---|
| A. Fatty Acids/Soaps | | | |
| None (Control) | — | trace | trace |
| Sodium Stearate | 0.001 | high | high |
| | 0.0025 | high | overflow |
| Stearic Acid | 0.001 | high | high |
| | 0.002 | high | overflow |
| Tallow Fatty Acid | 0.001 | high | high |
| | 0.002 | overflow | overflow |
| Behenic Acid | 0.002 | low | low |

TABLE I-continued

| Foam Evaluation of Potential Coating Agents | | | |
|---|---|---|---|
| Coating Material* | Wt.% in Solution | Foam Score No Soil | Foam Score Egg Yolk |
| B. Polymers | | | |
| SMA 1440 (2K) | 0.002 | low | low |
| | 0.004 | medium | medium |
| Alcosperse 107 | 0.001 | trace | trace |
| | 0.008 | trace | trace |
| EMA 1103 Butyl Ester | 0.002 | trace | trace |
| EMA 1103 Diacid | 0.002 | trace | trace |
| EMA 1103 Butyl (half ester) | 0.009 | none | none |

*Base powder Dishwasher "all" (0.5%)

EXAMPLE 2

Preparation of Bleach Encapsulates

A variety of polymer coated bleach particles have been prepared. Coating materials used in these preparations are described in Table II. Encapsulation was performed in the manner described below.

Coarse grade Clearon CDB-56 (ex. FMC) was sieved through a No. 16 mesh and held on No. 320 mesh (0.85 to 1.2 mm in diameter). For lab scale coating, 80 gm of the sieved CDB-56 were charged to a lab scale fluid bed coater. The fluidized bed was warmed to 60° C. A solution of the polymer (generally 5 to 15 wt. %) in the appropriate solvent was atomized onto the fluidized CDB-56 particles for about two hours at a pump rate of about 2.5 ml/minute. After all the polymer solution was exhausted, the capsules were further fluidized from 15 to 30 minutes to remove residual solvent. The resulting encapsulates were free flowing and appeared to be evenly coated. Scanning electron micrographs showed that the coatings were uniform in thickness and that the polymer adhered well to the bleach surface. There were random cracks in the coating and some air holes in the interior of the particles.

TABLE II

Polymer Coatings Used in Preparation of Encapsulated Bleach Particles[a]

| Polymer | Molecular Wt. | Trademark | Source |
|---|---|---|---|
| poly(styrene-maleic anyhdride) butyl half ester | 2,000 | SMA 1440 | Arco Chemicals |
| poly(styrene-maleic anhydride) butyl half ester | 25,000 | Scriptset | Monsanto |
| poly(ethylene-maleic anhydride) diacid form | 25,000 | EMA 1103 DA | Monsanto |
| poly(ethylene-maleic anhydride) | 25,000 | EMA 1103 | Monsanto |
| poly(ethylene-maleic anhydride) N—butyl half ester | 25,000 | EMA 1103 BE | Monsanto |
| poly(acrylic acid) | 50,000 | Acrysol A-1 | Rohm and Haas |
| poly(acrylic acid) | 10,000 | Goodrite K 725 | B.F. Goodrich |

[a]All encapsulates employed Clearon CDB-56 ex FMC

EXAMPLE 3

Release Properties

Various CDB-56 (sodium dichloroisocyanurate dihydrate) encapsulates were prepared by the method of Example 2. They were then evaluated for their ability to release the bleach in solution. Two tests were employed. In a Beaker Test, 0.25 gm of capsules were added to 3 liters of a 0.5% solution of commercial machine dishwashing product ("Dishwasher all", ex Lever Brothers Company). The solution was stirred at 45° C. by means of a magnetic stir bar. The extent of solution of the particle was assessed visually as a function of time although in some cases the % available chlorine was determined via a standard thiosulfate titration. This test was designed to give a quick indication of how readily the coating actually dissolved.

A second test, known as the Machine Dishwasher Test, involved the following procedure. Bleach capsules (1.25 gm) were gently mixed with 50 gm of Dishwasher "all". This mixture was added directly to the bottom of a Kenmore dishwasher at the beginning of a 10 minute wash cycle. Wash temperature was 50° C. while hardness was 120 ppm Ca/Mg 2:1. Samples of wash water were removed at 2 minute intervals. These samples were then analyzed for % available chlorine. To remove any undissolved bleach capsules the samples were filtered through coarse glass frits.

Representative results are shown in Table III. It is seen that for three of the classes of copolymers studied, i.e., SMA, EMA and BMA/MA, there is a drop in release rate above a critical level of substitution of hydrophobic groups in the polymer. This effect seems to be related to the molecular weight of the polymer. For example, with SMA of 2000 molecular weight, 50% butyl substitution yields a polymer having adequate release. However, this level of substitution appears to excessively retard the dissolution rate of a 25,000 molecular weight SMA copolymer. Similar trends are observed for other classes of polymers studied, e.g., EMA and BMA/MA copolymers.

TABLE III

Release Properties of Various Polymer Encapsulated Bleaches

| Polymer | Release Properties[a] Beaker Test (10 min.) | Dishwasher Test % of Av Cl Released (2 min.) |
|---|---|---|
| Uncoated CDB-56 (Control) | 1 | 85 |
| SMA 50% butyl ester, 2 K | | |
| 7.5% coating | 1 | 95 |
| 13.3% coating | 1 | 92 |
| 22.3% coating | 2 | 55 |
| SMA 50% butyl ester, 12 K (15%) | 2 | — |
| SMA 50% butyl ester, 25 K (15%) | 3 | 25 |
| SMA 25% Hexyl ester, 25 K (15%) | 3 | 14 |
| BMA/MA (50/50 wt ratio), K (15%) | 1 | — |
| BMA/MA (75/25 wt ratio), 12 K (15%) | 1 | — |
| BMA/MA (85/15 wt ratio), 15 K (15%) | 3 | — |
| EMA diacid, 25 K (15%) | 1 | — |
| EMA, 25 K (15%) | 1 | — |
| EMA 50% butyl ester, 25 K (15%) | 1 | — |
| EMA 50% hexyl ester, 25 K (15%) | 3 | 20 |
| Polyacrylic acid, 50 K (15%) | 1 | — |
| Polyacrylic acid, K (15%) | 1 | — |

[a]Beaker Test Rating
1 = completely dissolved after 10 minutes.
2 = more than half the capsules dissolved after 10 minutes.
3 = less than half the capsules dissolved after 10 minutes.

EXAMPLE 4

Processing and Performance

Based on the results of Example 3, a variety of encapsulating polymers were chosen that had optimal release rates. These polymers are identified in Table IV. CDB-56 was then encapsulated with these polymers. Resultant encapsulated bleach particles were then evaluated for storage stability and dishwashing performance. The results of these evaluations are described in Examples 5 and 6.

All encapsulates were prepared in a procedure similar to that used with SMA 1440 as described below.

1. 123.5 gm of SMA 1440 were dissolved in 750 gm of acetone that contained 0.1 gm of dye to color the coating solution.

2. 700 gm of CDB-56 was charged to the funnel of an Aeromatic fluid bed coater that was first treated with a spray of Static Guard (dimethyl ditallow ammonium chloride). The CDB-56 was a coarse grade that was first sieved through a No. 10 screen and held on a No. 25 screen.

3. CDB-56 was coated over a 45 minute interval under the following coating conditions: fan capacity =9; bed temperature=30° C.; resistance to air filter=30 to 50; large screen; coating delivery rate=40 ml/minute.

4. The coated particles were fluidized for an additional 30 minutes at 30° C. to remove residual acetone.

In this Example, 752.8 gm of capsules were recovered. Some polymer was lost on the walls of the funnel. Compositions and release rates are summarized in Table IV. The particles appeared evenly coated.

Table IV shows that most of the capsules had about 10% coating by weight. They retained their theoretical chlorine content and released well in an alkaline dishwashing detergent solution. These materials had adequate properties for further testing described in Examples 5 and 6. It should be noted that some of these Examples employed an aqueous coating solvent. Accordingly, processing is not limited to organic solvents.

TABLE IV

| Coating Polymer | Molecular Wt. | Commercial Designation | Coating Solvent | % Coating | Available Chlorine (%) | Chlorine Released (%) |
|---|---|---|---|---|---|---|
| poly(styrene-maleic anhydride) | 2,000 | SMA 1440 | Acetone | 10.6 | 49.3 | 91.2 |
| " | " | " | " | 7.45 | 54.3 | 93.0 |
| " | " | " | " | 13.3 | 51.0 | 96.0 |
| " | " | " | " | 22.3 | 45.7 | 92.0 |
| poly(ethylene-maleic anhydride) | 25,000 | EMA 1103 | Acetone | 6.1 | 51.8 | 92.0 |
| poly(ethylene-maleic anhydride) | 25,000 | EMA 1103 | Acetone | 12.4 | 48.2 | 95.1 |
| poly(ethylene-maleic anhydride) | 25,000 | EMA 1103 | Water | 13.5 | 47.6 | 93.0 |
| poly(acrylic acid) | 10,000 | Goodrite K-752 | Water | 9.2 | 49.8 | 96.5 |
| poly(acrylic acid) | 50,000 | Acrysol A-1 | Acetone | 11.8 | 48.5 | 99 |

Procedure for Chlorine Release Test

Three liters of tap water were stirred in a 4 liter water jacketed beaker with a propeller type stirrer until the temperature reached 50° C. Automatic dishwashing base powder (11.1 gm) was added to reach a concentration of 4 gm/l and the powder stirred for 2 minutes at 800 RPM's. Base powder consisted of: 35% sodium tripolyphosphate, 30% sodium carbonate, 7% sodium silicate, 3% nonionic surfactant, 10% sodium sulfate and various minor miscellaneous ingredients. Encapsulated bleach particles were added to yield potentially 65 ppm available chlorine. Every 2 minutes thereafter a 100 gm aliquot was titrated for available chlorine by standard thiosulfate procedure.

The results reported in Table IV are the available chlorine levels after 4 minutes.

EXAMPLE 5

Storage Stability

Each of the coated bleach samples prepared in Example 4 were mixed with base powder to yield about 150 gm of a dishwashing detergent containing 1% available chlorine. For each storage condition and time (e.g. 2 months) three samples were prepared with each of three lots of base powder giving a total of 6 samples (150 gm) for each test condition and time. The control was an uncoated sample of CDB-56 that was prescreened to the same particle size as the coated samples (pass #10 screen held on #25). The samples were placed in a chip board carton sealed and coated with an ethylene-vinyl acetate/wax on aluminum foil. Samples were stored under the following conditions.

Room temperature ambient humidity
80° F/80% relative humidity
95° F./50% relative humidity
90° F. to 125° F. cycle Periodically, samples were removed and analyzed for % available chlorine by a standard thiosulfate titration. Key results are summarized in Table V. Several points should be noted from these results. In general, all of the polymer coatings greatly improved the storage stability of the bleach relative to uncoated CDB-56 regardless of their degree of hydrophobicity. However, the most hydrophobic polymer, SMA-butyl half ester, provided the broadest protection over the range of storage conditions employed, i.e., humidity and temperature.

From the results in Table V for SMA, it appears that levels between about 5% and 15% are adequate coating levels. It is possible that still lower levels could be employed particularly if the coating is free of cracks.

TABLE V

Storage Stability of Polymer Encapsulated Bleach

| Polymer | % Coating | Storage Conditions (°F./% Moisture) | % Initial Chlorine Retained 3 Months | 6 Months |
|---|---|---|---|---|
| Uncoated | — | 95/50 | 75.0 | |
| SMA 1440 | 7.4 | " | 95 | |
| | 13.3 | " | 91.5 | |
| | 22.3 | " | 84.0 | |
| Uncoated | — | 90 to 125 | 58 | |
| SMA 1440 | 7.4 | " | 95 | |
| | 13.3 | " | 95 | |
| | 22.3 | " | 94 | |
| Uncoated | — | Room Temp. | | 60 |

TABLE V-continued

Storage Stability of Polymer Encapsulated Bleach

| Polymer | % Coating | Storage Conditions (°F./% Moisture) | % Initial Chlorine Retained 3 Months | 6 Months |
|---|---|---|---|---|
| SMA 1440 | 10.3 | " | | 100 |
| EMA 1103 | 6.1 | " | | 91 |
| EMA 1103BE | 12.4 | " | | 100 |
| EMA 1103DA | 13.5 | " | | 85 |
| PAA K-752 | 9.2 | " | | 100 |
| PAA A-1 | 11.8 | " | | 96 |
| Uncoated | — | 80/80 | | 40 |
| SMA 1440 | 10.3 | " | | 100 |
| EMA 1103 | 6.1 | " | | 89 |
| EMA 1103BE | 12.4 | " | | 50 |
| EMA 1103DA | 13.5 | " | | 22 |
| PAA K-752 | 9.2 | " | | 77 |
| PAA A-1 | 11.8 | " | | |
| Uncoated | — | 95/50 | | 20 |
| SMA 1440 | 10.3 | " | | 90 |
| EMA 1103 | 6.1 | " | | 82 |
| EMA 1103BE | 12.4 | " | | 78 |
| EMA 1103DA | 13.5 | " | | 76 |
| PAA K-752 | 9.2 | " | | 75 |
| PAA A-1 | 11.8 | " | | 70 |
| Uncoated | — | 90 to 125 | | 19 |
| SMA 1440 | 10.3 | " | | 85 |
| EMA 1103 | 6.1 | " | | 95 |
| EMA 1103BE | 12.4 | " | | 86 |
| EMA 1103DA | 13.5 | " | | 89 |
| PAA K-752 | 9.2 | " | | 98 |
| PAA A-1 | 11.8 | " | | 98 |

EXAMPLE 6

Spotting and Filming

This Example illustrates the improved glassware performance of machine dishwashing compositions containing the encapsulated bleach particles of the present invention.

Consumers judge performance of machine dishwashing compositions, to a large extent, on how well they leave glassware free of spots and film. Spotting and filming tests were run by the standard methods as reported in CSMA Test Method DCC-05A (12/81 - "Deposition on Glassware during Mechanical Dishwashing"). Before evaluation, the compositions were aged for six months as part of the study described in Examples 4 and 5. Table VI records spotting performance. Formulations that contain unencapsulated bleach show a significant deterioration in their spotting performance. Premium commercial powders, it should be noted, have spotting performance equal to 1 on this test. Table VI demonstrates that encapsulating the bleach with selected polymers virtually eliminates deterioration of performance as a result of storage. This ensures fresh product characteristics. Overall, SMA 1440 was seen to provide the best performance although the other coatings were also useful.

TABLE VI

Influence of Polymer Encapsulates on the Spotting Performance (6 Months Storage)

| Polymer | % Coating | Storage Conditions (°F./% Moisture) | Spotting Score[a] |
|---|---|---|---|
| Uncoated | — | Initial Fresh Sample | 1.0 |
| Uncoated | — | Room Temperature | 1.4 |
| SMA 1440 | 10.3 | " | 1.2 |
| EMA 1103DA | 13.5 | " | 1.1 |
| PAA K-752 | 9.2 | " | 1.1 |
| PAA A-1 | 11.8 | " | 1.2 |

TABLE VI-continued

Influence of Polymer Encapsulates on the Spotting Performance (6 Months Storage)

| Polymer | % Coating | Storage Conditions (°F./% Moisture) | Spotting Score[a] |
|---|---|---|---|
| Uncoated | — | 80/80 | 1.6 |
| SMA 1440 | 10.3 | " | 1.2 |
| EMA 1103DA | 13.5 | " | 1.3 |
| PAA K-752 | 9.2 | " | 1.3 |
| PAA A-1 | 11.8 | " | 1.25 |
| Uncoated | — | 95/50 | 2.0 |
| SMA 1440 | 10.3 | " | 1.1 |
| EMA 1103DA | 6.1 | " | 1.15 |
| PAA K-752 | 9.2 | " | 1.4 |
| PAA A-1 | 11.8 | " | 1.23 |
| Uncoated | — | 90 to 120 | 2.3 |
| SMA 1440 | 10.3 | " | 1.1 |
| EMA 1103DA | 13.5 | " | 1.2 |
| PAA K-752 | 9.2 | " | 1.4 |
| PAA A-1 | 11.8 | " | 1.15 |

[a]12 wash test per CSMA Test Method DCC-05A.
Scale
0 = spotless
1 = few spots
2 = ⅓ glass spotted
3 = ⅔ glass spotted
4 = glass completely covered with spots

EXAMPLE 7

Effect on Product Signals

Chlorine bleach stability is only one aspect of the benefits derived from coating the chlorine core particles. Now it has been found that the dishwashing composition color and odor are also stabilized by the particles of the present invention.

Lemon motif commercially available automatic dishwashing base powder, before being dosed with chlorine bleach, is typically a vivid yellow powder with a striking lemon scent. After the hot moist powder is dosed with chlorine, however, the powder immediately begins to fade and its odor deteriorates rapidly. These undesirable interactions can be reduced by first conditioning the powder for several hours. Unfortunately, this slows production throughput and, in any event, would not alleviate long term ingredient interaction problems. Experiments with the encapsulated bleach particles of the present invention have been conducted to evaluate their performance when dosed into base powder not previously conditioned.

Table VII demonstrates that the encapsulated bleach of the present invention substantially retains the crisp signals of the base powder.

TABLE VII

Effect of Encapsulation on Fragrance and Odor[a]

| Polymer Coating | Color Retention[b] | Fragrance Retention[b] |
|---|---|---|
| Base powder - no chlorine | 4 | 4 |
| Uncoated chlorine | 1 | 2 |
| SMA 1440A (styrene/maleic anhydride butyl half ester MW = 2000) | 3 | 3 |

[a]Stored two months at room temperature.
[b]Scored on a 5 point scale with 1 being the worst and 5 being the best.

The foregoing description and examples illustrate selected embodiments of the present invention. In light thereof, various modifications will be suggested to one skilled in the art, all of which are within the spirit and purviews of this invention

What is claimed is:

1. A particle for releasing bleach consisting essentially of:

(i) from 50 to 99.5% by weight of said particle of a core consisting essentially of an oxidizing material having at least one reactive chlorine of bromine in its molecular structure; and (ii) from 0.5 to 20% by weight of said particle of a polycarboxylate coating which is selected from homo- and Co-polymers whose monomer units are selected from the group consisting of acrylid acid, methacrylic acid, $C_1$-$C_{20}$ alkyl acrylate and methacrylate, vinyl acetate, styrene, maleic, anhyride, ethylene/maleic anhydride and mixtures thereof, said coating being free of soap and fatty acids, said coating also being water-insoluble at pH 7 but soluble in aqueous alkaline media at pH 10 or higher.

2. A particle according to claim 1 wherein said homopolymer is selected from the group consisting of poly(-methacrylic acid), poly(acrylic acid) and their salt derivatives.

3. A particle according to claim 2 wherein said homopolymers have a molecular weight ranging from 1,000 to 200,000.

4. A particle according to claim 1 wherein said copolymer is selected from the group consisting of poly(ethylene/maleic anhydride), poly(ethylene/maleic anhydride/partial $C_1$-$C_{20}$ alkyl ester), and their salt derivatives.

5. A particle according to claim 1 wherein the copolymer is selected from the group consisting of poly(-styrene/$C_1$-$C_{20}$ alkyl maleic acid half ester), poly(-maleic anhydride/$C_1$-$C_{20}$ alkyl maleic acid half ester), poly(acrylic acid/$C_1$-$C_{20}$ alkyl methacrylate), poly(methacrylic acid/$C_1$-$C_{20}$ alkyl acrylate), poly(acrylic acid/$C_1$-$C_{20}$ alkyl acrylate), poly(methacrylic acid/-$C_1$-$C_{20}$ alkyl methacylate), poly(acrylic acid/$C_1$-$C_{20}$ alkyl acrylate/vinyl acetate), poly(methacrylic acid/-$C_1$-$C_{20}$ alkyl methacrylate/vinyl acetate), and their salt derivatives.

6. A particle according to claim 5 wherein the copolymer is a poly(styrene/$C_1$-$C_{20}$ alkyl maleic anhydride half ester).

7. A particle according to claim 6 wherein said copolymer has a number average molecular weight between 1,000 and 12,000.

8. A particle according to claim 6 wherein the polymer has a degree of esterification between 1% and 50% per mole of said acid.

9. A particle according to claim 6 wherein the degree of esterification ranges from 25% to 35% per mole of said acid.

10. A particle according to claim 6 wherein the alkyl group has between 2 and 8 carbon atoms.

11. A particle according to claim 6 wherein the copolymer is a butyl half ester of a 1:1 copolymer of styrene and maleic anhydride.

12. A particle according to claim 11 wherein the molecular weight of said copolymer is 2,000.

13. A particle according to claim 1 wherein the coating is a partial $C_1$-$C_{20}$ alkyl ester of the copolymer of ethylene with maleic anhydride.

14. A particle according to claim 1 wherein the coating is a polymer of acrylic acid partially esterified with $C_1$-$C_{20}$ alkyl groups.

15. A particle according to claim 1 wherein the oxidizing material is an alkali metal salt of a chlorine bleaching agent selected from the group consisting of dichloro-, trichloro-isocyanurate and mixtures thereof.

16. A particle according to claim 15 wherein the oxidizing material is sodium dichloroisocyanurate dihydrate.

17. A particle according to claim 1 wherein the oxidizing material is present in an amount from 85% to about 95% by weight of the particle.

* * * * *